US007725919B1

(12) United States Patent
Thiagarajan et al.

(10) Patent No.: US 7,725,919 B1
(45) Date of Patent: May 25, 2010

(54) MANAGE CONTENT IN A SHORT-TERM CONTENT BUFFER WITH CONTENT IDENTIFIERS

(75) Inventors: Balaji Thiagarajan, San Jose, CA (US); Sharad Garg, Sunnyvale, CA (US); Arvind Kumar Peechara, Sunnyvale, CA (US); Theodore Nguyen, San Jose, CA (US); Parichay Saxena, Milpitas, CA (US)

(73) Assignee: Microsoft Corporation, Redmond, WA (US)

( * ) Notice: Subject to any disclaimer, the term of this patent is extended or adjusted under 35 U.S.C. 154(b) by 1502 days.

(21) Appl. No.: 10/154,762

(22) Filed: May 23, 2002

(51) Int. Cl.
*H04N 7/16* (2006.01)

(52) U.S. Cl. ........................ 725/139; 725/34; 725/101; 725/112

(58) Field of Classification Search .................. 725/87, 725/88, 94, 139, 34, 101, 112
See application file for complete search history.

(56) References Cited

U.S. PATENT DOCUMENTS

| | | | | |
|---|---|---|---|---|
| 5,629,732 | A | 5/1997 | Moskowitz et al. | |
| 6,304,714 | B1 * | 10/2001 | Krause et al. | 386/52 |
| 6,445,872 | B1 * | 9/2002 | Sano et al. | 386/46 |
| 6,543,053 | B1 * | 4/2003 | Li et al. | 725/88 |
| 6,642,939 | B1 * | 11/2003 | Vallone et al. | 715/721 |
| 6,971,121 | B2 * | 11/2005 | West et al. | 725/142 |
| 2002/0124259 | A1 * | 9/2002 | Chang et al. | 725/91 |
| 2003/0093803 | A1 * | 5/2003 | Ishikawa et al. | 725/94 |
| 2003/0106064 | A1 * | 6/2003 | Plourde, Jr. | 725/91 |
| 2003/0110514 | A1 * | 6/2003 | West et al. | 725/134 |
| 2004/0163125 | A1 * | 8/2004 | Phillips et al. | 725/119 |
| 2006/0136827 | A1 * | 6/2006 | Villaron et al. | 715/730 |
| 2006/0150212 | A1 * | 7/2006 | Magnussen et al. | 725/32 |

FOREIGN PATENT DOCUMENTS

| | | |
|---|---|---|
| EP | 1180768 | 2/2002 |
| WO | WO9532584 | 11/1995 |
| WO | WO0062298 | 10/2000 |

OTHER PUBLICATIONS

European Search Report For European Patent Application No. 03008011.3 Mailed On Nov. 7, 2007 pp. 5.

* cited by examiner

*Primary Examiner*—Joseph P Hirl
*Assistant Examiner*—Jivka Rabovianski
(74) *Attorney, Agent, or Firm*—Lee & Hayes, PLLC

(57) ABSTRACT

A short-term content buffer maintains segments of audio and/or video content and the content segments are identified with segment identifiers which enables management and playback of the content segments. In an embodiment, independent video content segments corresponding to a particular broadcast channel can be identified by associated content segment identifiers and the video content segments can be recorded together to generate a single recording of the content.

63 Claims, 5 Drawing Sheets

MANAGE CONTENT IN A SHORT-TERM CONTENT BUFFER WITH CONTENT IDENTIFIERS

TECHNICAL FIELD

This invention relates to television entertainment and information architectures and, in particular, to the management of audio and/or video content maintained in a short-term content buffer.

BACKGROUND

Digital video recorders are implemented as client devices to receive video and/or audio content in the form of broadcast and/or interactive television entertainment and information. A digital video recorder includes a hard disk memory so that a viewer can record multiple television programs and other content of interest to the viewer. A digital video recorder also provides a viewer with convenient functionality, such as the ability to pause the broadcast of a television program and return to watch the program, while still in progress, from the point at which it was paused.

To implement this functionality, a digital video recorder includes a pause buffer to record a current broadcast of a paused program, and to playback the broadcast for viewing from the beginning of the pause event when a viewer returns to continue watching the program. A pause buffer is typically configured as a circular, or ring, buffer on the hard disk memory and the amount of time which a television program can be delayed is dependent upon how much storage space is allocated for the pause buffer. When a pause buffer reaches capacity, such as after thirty minutes for example, the content corresponding to the beginning of a pause event will be written over. This example pause buffer is a sliding thirty minute recorder of the most recently displayed content.

Additionally, when a viewer changes from one broadcast channel to another, any content stored in the pause buffer is deleted (commonly referred to as "flushing" the pause buffer). A viewer can only access content maintained in the pause buffer for the duration of time that the viewer watches a particular channel without changing the channel. Further, conventional systems do not enable viewer management of the video content stored in a pause buffer, such as selecting which content in the pause buffer to record, or other viewer-input controls, such as fast-forward, rewind, and the like.

Accordingly, for television-based entertainment and information systems, there is a need for techniques to manage content temporarily stored in a short-term content buffer, such as in a pause buffer in a digital video recording system.

SUMMARY

A short-term content buffer maintains segments of audio and/or video content and the content segments are identified with segment identifiers which enables management and playback of the content segments. In an embodiment, independent video content segments corresponding to a particular broadcast channel can be identified by associated content segment identifiers and the video content segments can be recorded together to generate a single recording of the content.

The segments of audio and/or video content maintained in the short-term content buffer can each be bookmarked, or otherwise identified with a content and/or segment identifier, to enable management and playback of the audio and/or video content segments. Bookmarks can be created in response to a user input, to identify a broadcast channel change corresponding to a segment of video content stored in the short-term content buffer, to identify a segment of audio and/or video content corresponding to a defined time interval, or to identify a program change on a broadcast channel.

BRIEF DESCRIPTION OF THE DRAWINGS

The same numbers are used throughout the drawings to reference like features and components.

DETAILED DESCRIPTION

Systems and methods are described to manage audio and/or video content maintained in a short-term content buffer. The content buffer and a content buffer component can be implemented as components of a digital video recording system to maintain segments of rendered video content and enable a viewer to record segments of the rendered video content which is maintained in the short-term content buffer even after the viewer changes broadcast channels to view different programs on different broadcast channels.

The segments of audio and/or video content maintained in the short-term content buffer can each be bookmarked, or otherwise identified with a content and/or segment identifier, to enable management and playback of the audio and/or video content segments. Bookmarks can be created in response to a user input, to identify a broadcast channel change corresponding to a segment of video content stored in the short-term content buffer, to identify a segment of audio and/or video content corresponding to a defined time interval, or to identify a program change on a broadcast channel.

The following discussion is directed to television-based entertainment and information systems, such as interactive TV networks, cable networks that utilize electronic program guides, and Web-enabled TV networks. Client devices in such systems include full-resource clients with substantial memory and processing resources, such as TV-enabled personal computers and digital video recorders equipped with hard-disks. While aspects of the described systems and methods can be used in any of these systems and for any types of client devices, they are described in the context of the following exemplary environment.

Exemplary System Architecture

Figure 1:
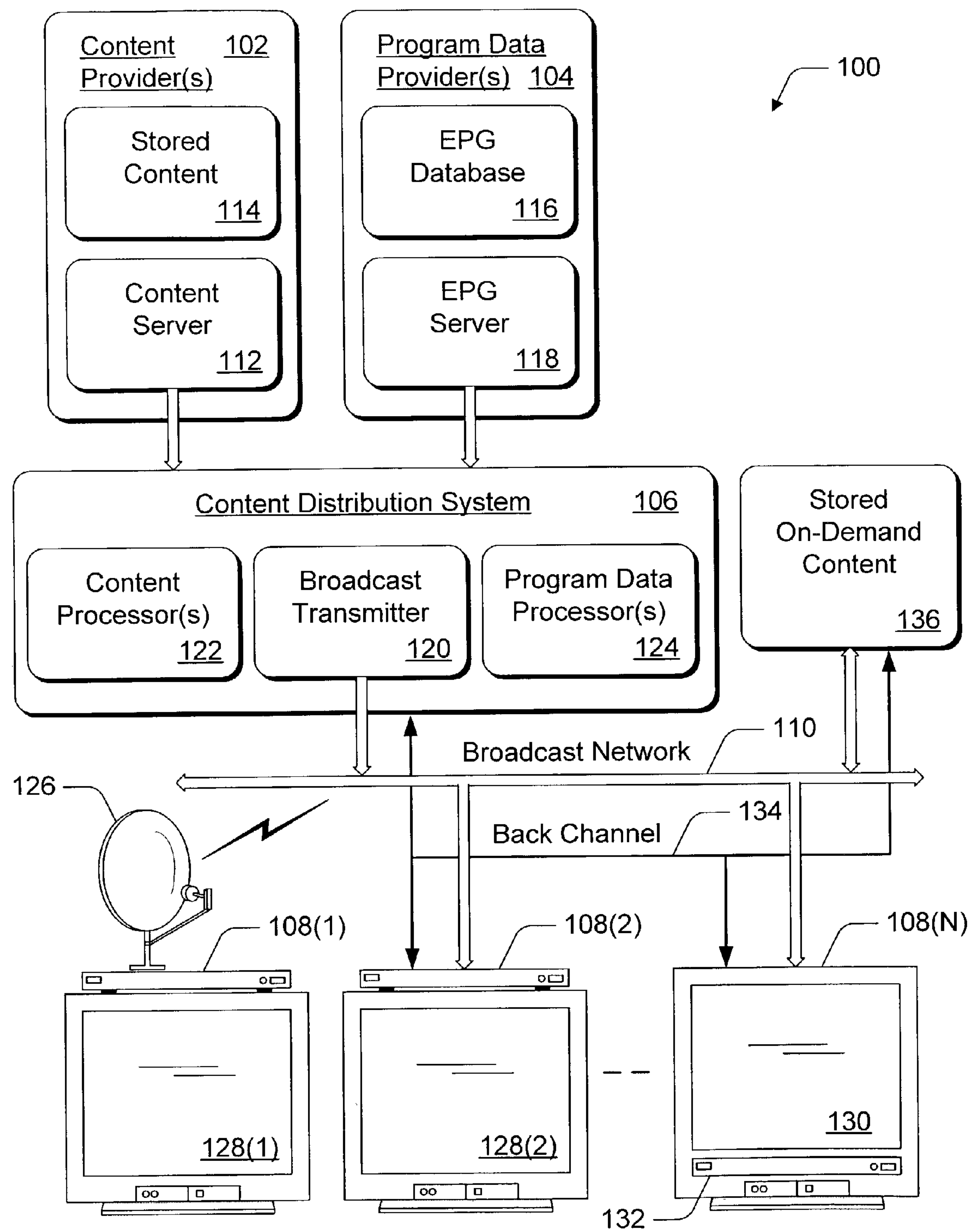
FIG. 1 illustrates an exemplary system architecture in which the systems and methods for content buffer management can be implemented.

FIG. 1 illustrates an exemplary television entertainment system 100 that is an architecture in which content buffer management can be implemented. System 100 facilitates distribution of content and program data to multiple viewers, and includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content.

Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106. Program data provider 104 includes an electronic program guide (EPG) database 116 and an EPG server 118. The EPG database 116 stores electronic files of program data which is used to generate an electronic program guide (or, "program guide"). Program data (or, "EPG data") includes program titles, ratings, characters, descriptions, actor names, station identifiers, channel identifiers, schedule information, and so on.

The EPG server 118 processes the program data prior to distribution to generate a published version of the program data which contains programming information for all channels for one or more days. The processing may involve any number of techniques to reduce, modify, or enhance the program data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 104 via a satellite directly to a client device 108.

Content distribution system 106 includes a broadcast transmitter 120, one or more content processors 122, and one or more program data processors 124. Broadcast transmitter 120 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processor 122 processes the content received from content provider 102 prior to transmitting the content across broadcast network 110. Similarly, a program data processor 124 processes the program data received from program data provider 104 prior to transmitting the program data across broadcast network 110. A particular content processor 122 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service, or network operator, that provides EPG data, as well as content, to multiple subscribers. Each content distribution system 106 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), . . . , 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via a satellite dish 126. Client device 108(1) is also referred to as a set-top box or a satellite receiving device. Client device 108(1) is coupled to a television 128(1) for presenting the content received by the client device (e.g., audio data and video data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(N) is an example of a combination television 130 and integrated set-top box 132. In this example, the various components and functionality of the set-top box are integrated into the television, rather than using two separate devices. The set-top box integrated into the television can receive broadcast signals via a satellite dish (similar to satellite dish 126) and/or via broadcast network 110. In alternate implementations, client devices 108 may receive broadcast signals via the Internet or any other broadcast medium, such as back channel 134 which can be implemented as an Internet protocol (IP) connection using a modem connection and conventional telephone line, for example. Further, back channel 134 provides an alternate communication link between each of the client devices 108, and between the client devices 108 and the content distribution system 106.

Each client device 108 can run an electronic program guide (EPG) application that utilizes the program data. An EPG application enables a television viewer to navigate through an onscreen program guide and locate television shows and other broadcast content of interest to the viewer. With an EPG application, the television viewer can look at schedules of current and future programming, set reminders for upcoming programs, and/or enter instructions to record one or more television shows.

The exemplary system 100 also includes stored on-demand content 136, such as Video On-Demand (VOD) movie content. The stored on-demand content can be viewed with a television 128 via a client device 108 through an onscreen movie guide, for example, and a viewer can enter instructions to stream a particular movie, or other stored content, down to a corresponding client device 108.

Exemplary Client Device

Figure 2:
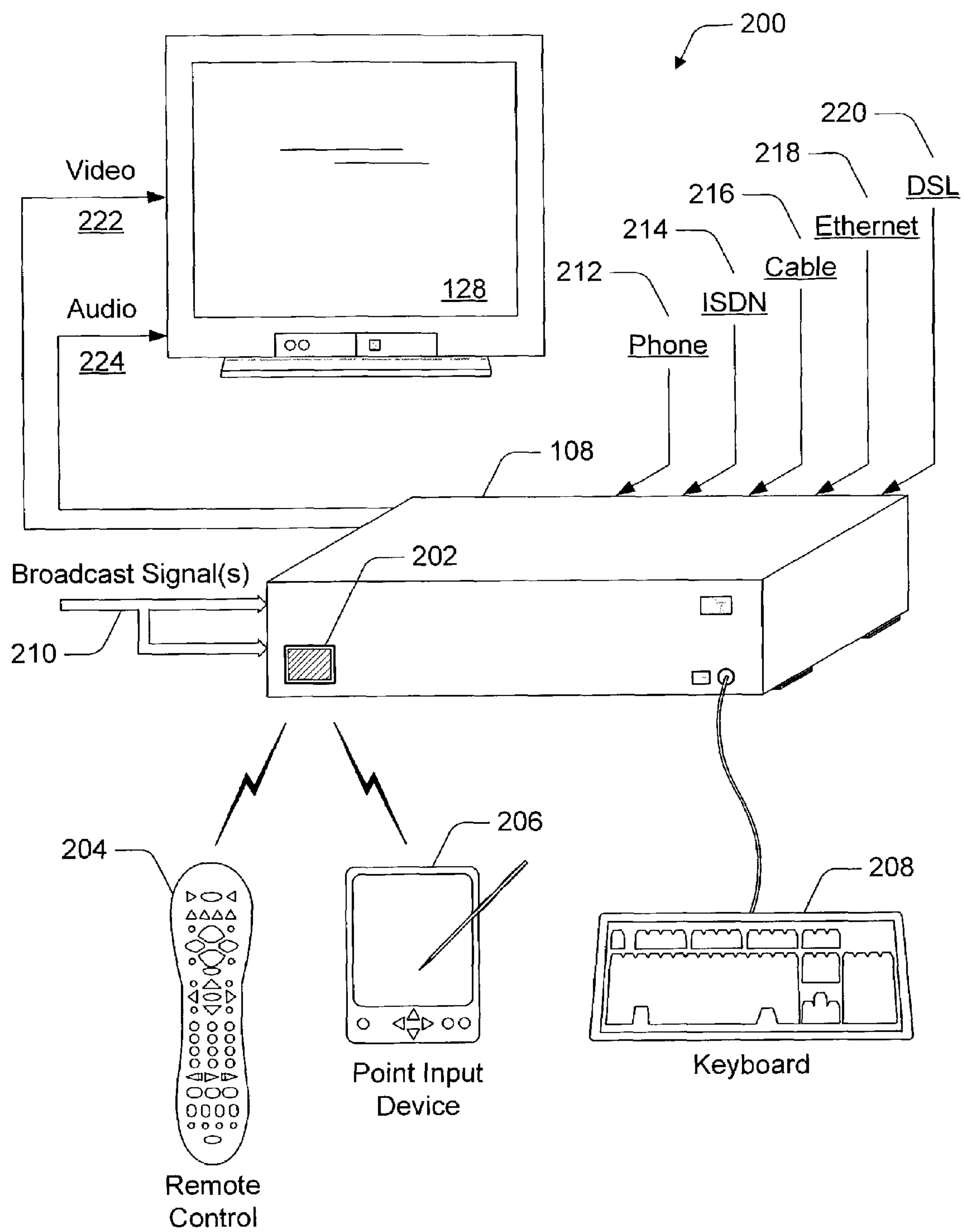
FIG. 2 illustrates of an example client device, a television, and various input devices that interact with the client device.

FIG. 2 illustrates an exemplary implementation 200 of a client device 108 shown as a standalone unit that connects to a television 128. Client device 108 can be implemented in any number of embodiments, including as a set-top box, a satellite receiver, a TV recorder with a hard disk, a digital video recorder (DVR) and playback system, a game console, an information appliance, and so forth.

Client device 108 includes a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding broadcast signal 210, such as an NTSC, PAL, SECAM, or other TV system video signal. Client device 108 also includes hardware and/or software for providing the user with a graphical user interface by which the user can, for example, access various network services, configure the client device 108, and perform other functions.

Client device 108 can communicate with other devices via one or more connections including a conventional telephone line 212, an ISDN link 214, a cable link 216, an Ethernet link 218, a DSL link 220, and the like. Client device 108 may use any one or more of the various communication links 212-220 at a particular instant to communicate with any number of other devices.

Client device 108 generates video signal(s) 222 and audio signal(s) 224, both of which are communicated to television 128. The video signals and audio signals can be communicated from client device 108 to television 128 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Exemplary Digital Video Recording System and Content Buffer

Figure 3:
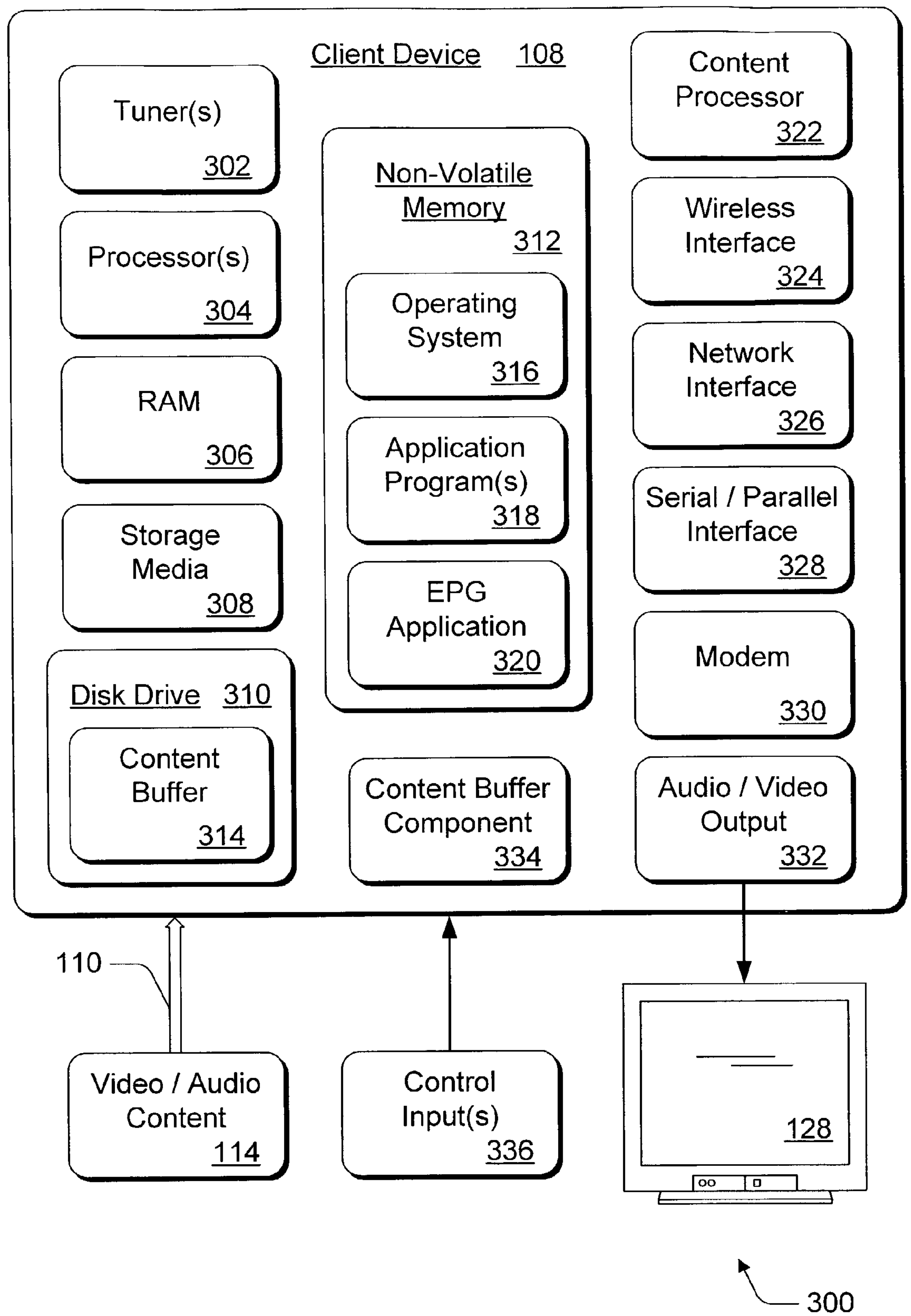
FIG. 3 illustrates various components of an exemplary digital video recording system that includes a client device and content buffer management components.

FIG. 3 illustrates an exemplary digital video recording system 300 that includes selected components of television system 100, such as an exemplary client device 108 as shown in FIGS. 1 and 2, and a television 128. Client device 108 includes components to implement a digital video recording system and audio and/or video content buffer management.

Client device 108 includes one or more tuners 302 which are representative of one or more in-band tuners that tune to various frequencies or channels to receive television signals, as well as an out-of-band tuner that tunes to the broadcast channel over which the EPG data is broadcast to client device 108. Client device 108 also includes one or more processors 304 which process various instructions to control the operation of client device 108 and to communicate with other electronic and computing devices.

Client device 108 can be implemented with one or more memory components, examples of which include a random access memory (RAM) 306, a mass storage component 308, a disk drive 310, and a non-volatile memory 312 (e.g., ROM, Flash, EPROM, EEPROM, etc.). The memory components (e.g., RAM 306, storage media 308, disk drive 310, and non-volatile memory 312) store various information and/or data such as received content, EPG data, configuration information for client device 108, and/or graphical user interface information. Further, disk drive 310 includes a portion of memory allocated as a short-term content buffer 314 which maintains video and/or audio content 114 (identified in FIG. 1 as "stored content") received via broadcast network 110.

The content buffer 314 stores segments of television broadcast channel data streams and/or segments of audio content and can be configurable to store, or otherwise maintain, thirty minutes of content, sixty minutes of content, or any other measure of content based on a time value or based on a quantity value. When a viewer is watching a first broadcast channel, the content buffer 314 stores the received content and when the viewer changes to a second broadcast channel, the content buffer 314 continues to maintain the received content corresponding to the first broadcast channel (up until the channel change) and begins to store the received content corresponding to the second broadcast channel.

An operating system 316 and one or more application programs 318 can be stored in non-volatile memory 312 and executed on a processor 304 to provide a runtime environment. A runtime environment facilitates extensibility of client device 108 by allowing various interfaces to be defined that, in turn, allow application programs 318 to interact with client device 108. The application programs 318 that may be implemented in client device 108 can include a browser to browse the Web (e.g., "World Wide Web"), an email program to facilitate electronic mail, a video recorder application or component to facilitate storing received content on disk drive 310 for example, and so on. An EPG application 320 is stored in memory 312 to operate on the EPG data and generate a program guide. Client device 108 can also include other components pertaining to a television entertainment system which are not illustrated in this example. For instance, client device 108 can include a user interface application and user interface lights, buttons, controls, and the like to facilitate viewer interaction with the device.

Client device 108 also includes a content processor and/or decoder 322 to process and decode a broadcast video signal, such as an NTSC, PAL, SECAM, or other TV system video signal. Content processor 322 can also include a video decoder and/or additional processors to receive, decode, and/or process video content received from content distribution system 106 (e.g., a network operator). For example, content processor 322 may include an MP3 or MPEG-2 (Moving Pictures Experts Group) decoder that decodes MPEG-encoded video and advertisement content. MPEG-2 supports a variety of audio/video formats, including legacy TV, HDTV (high-definition television), DVD (digital versatile disc), and five-channel surround sound.

Typically, video content includes video data and audio data that corresponds to the video data. Content processor 322 generates video and/or display content that is formatted for display on display device 128, and generates decoded audio data that is formatted for broadcast by a broadcast device, such as one or more speakers (not shown) in display device 128. Content processor 322 can include a display controller (not shown) that processes the video and/or display content to display corresponding images on display device 128. A display controller can include a microcontroller, integrated circuit, and/or similar video processing component to process the images. It is to be appreciated that the systems and methods described herein can be implemented for any type of encoding format as well as for data and/or content streams that are not encoded.

Client device 108 further includes a wireless interface 324, a network interface 326, a serial and/or parallel interface 328, and a modem 330. Wireless interface 324 allows client device 108 to receive input commands and other information from a user-operated input device, such as from a remote control device or from another IR, Bluetooth, or similar RF input device.

Network interface 326 and serial and/or parallel interface 328 allows client device 108 to interact and communicate with other electronic and computing devices via various communication links. Although not shown, client device 108 may also include other types of data communication interfaces to communicate with other devices. Modem 330 facilitates client device 108 communication with other electronic and computing devices via a conventional telephone line. Client device 108 also includes an audio and/or video output 332 that provides signals to television 128 or to other devices that process and/or display, or otherwise render, the audio and video data.

Client device 108 includes a content buffer component 334 that manages received audio and/or video content which is maintained in content buffer 314. The content buffer component 334 can be implemented as a software component that executes on a processor 304 and is stored in non-volatile memory 312. Content buffer component 334 creates bookmarks, or other content and/or segment identifiers, to identify intervals of the content or to demarcate segments of television broadcast channel data streams and/or segments of audio content maintained in the content buffer 314.

For example, when a viewer is watching a first broadcast channel, and changes to a second broadcast channel, the content buffer 314 continues to maintain the received content corresponding to the first broadcast channel (up until the channel change) and then begins to store the received content corresponding to the second broadcast channel. Content buffer component 334 creates a first bookmark to identify the content segment corresponding to the first broadcast channel, and creates a second bookmark to identify the content segment corresponding to the second broadcast channel.

Further, content buffer component 334 can create bookmarks, or other content and/or segment identifiers, to identify a program change on a broadcast channel, or each successive defined time interval, such as every two minutes, five minutes, and the like. Bookmarks to identify intervals of content or segments of content stored in content buffer 314 can be created as system defaults, or in response to viewer input. Content buffer component 334 receives viewer commands as control inputs 336, such as from viewer-operated remote control device 204, handheld device 206, and/or keyboard 208. The viewer-inputs can include commands such as record, fast-forward, rewind, pause, and the like.

The input commands may be input via an RF, IR, Bluetooth, or similar communication link or other mode of transmission to communicate with content buffer component 334. Additionally, the content buffer component 334 can delete particular segments of content from the content buffer 314 as identified by the respective segment identifiers (e.g., bookmarks, content identifiers, etc.).

Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 4:
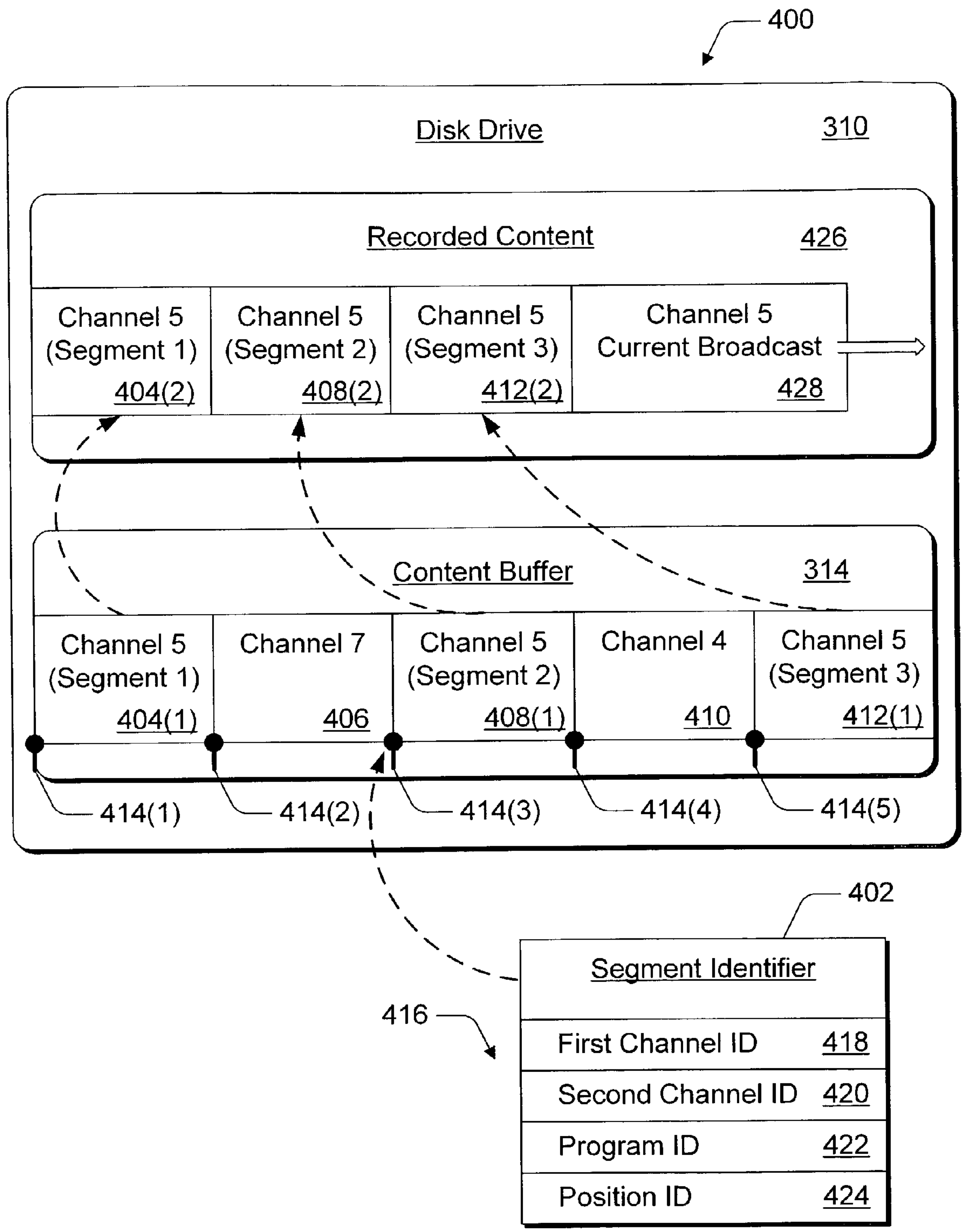
FIG. 4 illustrates exemplary content buffer management.

FIG. 4 illustrates a system 400 for content buffer management which includes disk drive 310, content buffer 314, a segment identifier 402 implemented as a data structure, and selected components of system 300 (FIG. 3). Content buffer 314 can be implemented as an allocated memory section of disk drive 310 to maintain segments of audio content and/or rendered video content.

In the example shown in FIG. 4, content buffer 314 includes several segments of video content corresponding to different broadcast channels. When a viewer begins watching broadcast channel five, the rendered program content is stored in content buffer 314 as a video content segment 404(1) that corresponds to broadcast channel five (also identified as "Segment 1" associated with channel five). When the viewer changes channels to broadcast channel seven, the rendered program content corresponding to broadcast channel seven is stored in content buffer 314 as a video content segment 406.

When the broadcast channel is changed from channel seven back to channel five, the rendered program content is stored in content buffer 314 as video content segment 408(1) that corresponds to broadcast channel five (also identified as "Segment 2" associated with channel five). The example continues with the viewer changing to channel four and then back again to channel five, and segments of the rendered program content corresponding to each broadcast channel being stored in content buffer 314 as segment 410 and segment 412(1) respectively.

Bookmarks, or other content and/or segment identifiers, identify each broadcast channel change and respective segment of video content in content buffer 314. Bookmark 414(1) identifies video content segment 404(1), bookmark 414(2) identifies video content segment 406, bookmark 414(3) identifies video content segment 408(1), and so on for each successive segment of audio and/or video content maintained in content buffer 314. Although this example illustrates bookmarks that identify broadcast channel changes, bookmarks can be created in response to a viewer input to create a bookmark, to indicate program changes on a particular broadcast channel, or can be created based on time durations, such as every minute for example.

A bookmark 414 can be created within the content buffer 314 itself and maintained as part of the content segment that it identifies, or is otherwise associated with. A bookmark 414 can also be created as an indication point within the audio and/or video content, or as any number and type of indicators or identifiers, such as flags, data bits, and the like. Further, a content or segment identifier 402 can be created as a data structure 416 that references to a position in the content buffer 314, but is maintained separately.

Segment identifier 402 (implemented as data structure 416) includes a first broadcast channel identifier 418, a second broadcast channel identifier 420, a program identifier 422, and a position identifier 424. In the illustrated example, the first broadcast channel identifier 418 would identify channel seven (e.g., the channel changed from), the second broadcast channel identifier 420 would identify channel five (e.g., the channel changed to), the program identifier 422 can include a description of the program being broadcast on channel five which is the subject of video content segment 408(1), and the position identifier 424 references the position of the segment identifier 402 in the content buffer 314. A segment identifier 402 implemented as data structure 416 can be implemented as any number and format of electronic data types, components, structures, objects, and the like.

When a viewer is watching broadcast channel five and the rendered program content is stored in content buffer 314 as a segment 412(1), and the viewer initiates a record input 336, the content buffer component 334 (FIG. 3) can determine that video content segments 404(1) (channel five, segment 1), 408(1) (channel five, segment 2), and 412(1) (channel five, segment 3) are all associated with channel five. Recorded content 426 is generated and the individual video content segments of channel five are stored in disk drive 310 as a single recording, to include segment 404(2), 408(2), 412(2), and the remaining current broadcast 428 of channel five.

Method for Content Buffer Management

A method for managing audio and/or video content stored, or otherwise maintained, in a short-term content buffer may be described in the general context of computer-executable instructions. Generally, computer-executable instructions include routines, programs, objects, components, data structures, and the like that perform particular functions or implement particular abstract data types. A method for content buffer management may also be practiced in distributed computing environments where functions are performed by remote processing devices that are linked through a communications network. In a distributed computing environment, computer-executable instructions may be located in both local and remote computer storage media, including memory storage devices.

Figure 5:
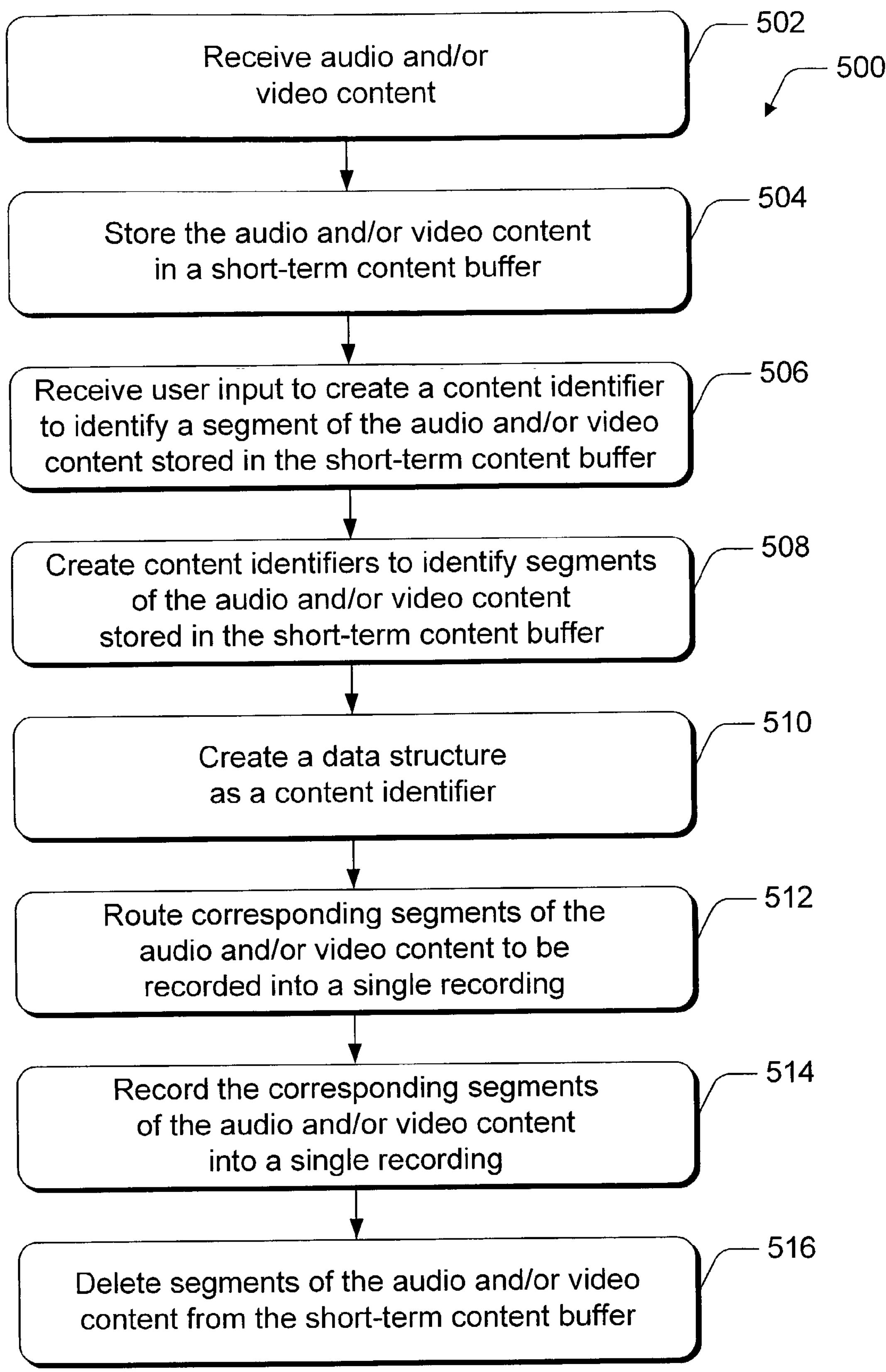
FIG. 5 is a flow diagram that illustrates a method for content buffer management.

FIG. 5 illustrates a method 500 for content buffer management. The order in which the method is described is not intended to be construed as a limitation, and any number of the described method blocks can be combined in any order to implement the method. Furthermore, the method can be implemented in any suitable hardware, software, firmware, or combination thereof.

At block 502, audio and/or video content is received, and at block 504, the audio and/or video content is stored in a short-term content buffer. Storing video content can include storing a first segment of the video content corresponding to a first broadcast channel and storing at least a second segment of the video content corresponding to a second broadcast channel. For example, content buffer 314 maintains a video content segment 404(1) corresponding to broadcast channel five, and also maintains at least video content segment 406 corresponding to broadcast channel seven (FIG. 4).

At block 506, a user input is received to create a content identifier to identify a segment of the audio and/or video content stored in the short-term content buffer. At block 508, content identifiers are created to identify segments of the audio and/or video content stored in the short-term content buffer. For example, a content identifier (e.g., segment identifier 402) identifies video content segment 408(1) stored in content buffer 314 (FIG. 4). Additionally, a content identifier can be created to identify a broadcast channel change corresponding to a segment of the video content stored in the short-term content buffer, to identify a segment of the audio and/or video content corresponding to a defined time interval, or to identify a program change on a broadcast channel. A first content identifier can be created to identify a first video content segment and a second content identifier can be created to identify at least a second video content segment in the short-term content buffer. For example, a first content identifier 414(1) identifies video content segment 404(1) and a second content identifier 414(2) identifies video content segment 406 in content buffer 314 (FIG. 4).

At block 510, a data structure is created as a content identifier. For example, content identifier (e.g., segment identifier 402) is a data structure 416 that maintains a first broadcast channel identifier 418, a second broadcast channel identifier 420, a program identifier 422 to identify the program broadcast on the second broadcast channel, and a position identifier 424 to identify a position of the content identifier in the short-term content buffer 314.

At block 512, segments of the audio and/or video content are communicated, or routed, to be recorded as a single audio and/or video recording, and at block 514, the segments of the audio and/or video content are recorded. For example, content buffer component 334 communicates video content segments 404, 408, and 412 which correspond to broadcast channel five to be recorded, or otherwise stored, as recorded content 426 in disk drive 310 (FIG. 4). The content buffer component 334 determines which video content segments maintained in content buffer 314 correspond to broadcast channel five by associated channel change identifiers 414(1), 414(3), and 414(5), respectively.

At block 516, segments of the audio and/or video content are deleted from the short-term content buffer. For example, the video content segments 404, 408, and 412 which correspond to broadcast channel five can be deleted by the content buffer component 334 after the segments are recorded, in response to a viewer input to delete the stored content from the content buffer, or when the content buffer 314 has reached its capacity and the content buffer component 334 begins freeing up the resource.

Conclusion

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A digital video recording system which facilitates viewer management of rendered video content, the digital video recording system comprising:

a processor;

one or more memory components in communication with the processor;

a portion of the one or more memory components allocated as a content buffer configured to maintain the rendered video content; and instructions stored upon the one or more memory components that when executed by the processor configure the processor to implement a content buffer processing component configured to create one or more bookmark data structures (bookmarks) within the content buffer to identify segments of the rendered video content maintained in the content buffer, wherein the one or more bookmarks facilitate management of the rendered video content, wherein the processor is configured to store video content received from a first channel as a first content segment in the content buffer, wherein a first bookmark indentifies the first content segment, wherein, following receiving a first channel change from the first channel to a second channel, the processor is configured to store video content received from the second channel as a second content segment in the content buffer, wherein a second bookmark identifies the second content segment, wherein, following receiving a second channel change back to the first channel, the processor is configured to store video content received from the first channel in a third content segment, wherein a third bookmark identifies the third content segment, wherein, following receiving an instruction to record, as recorded content, the video content being currently received from the first channel, the processor is configured to add the first content segment and the third content segment to the recorded content to generate a single recording based on associations of the first bookmark and the third bookmark with the first channel being currently received.

2. A digital video recording system as recited in claim 1, wherein the content buffer is further configured to maintain the rendered video content received from one or more broadcast channels.

3. A digital video recording system as recited in claim 1, wherein the content buffer is further configured to maintain the rendered video content received as an Internet broadcast stream.

4. A digital video recording system as recited in claim 1, wherein the content buffer is further configured to maintain the rendered video content received as requested video on-demand content.

5. A digital video recording system as recited in claim 1, wherein the processor is configured to receive input from a viewer while viewing the video content to create at least one viewer created bookmark.

6. A digital video recording system as recited in claim 1, wherein the content buffer is further configured to maintain the rendered video content received from one or more broadcast channels, and wherein the content buffer component is further configured to create a channel change bookmark within the content buffer to identify a segment of the rendered video content following a channel change.

7. A digital video recording system as recited in claim 1, wherein the content buffer component is further configured to receive a plurality of inputs from the viewer to create a plurality of bookmarks within the content buffer.

8. A digital video recording system as recited in claim 1, wherein the content buffer component is further configured to create a bookmark within the content buffer for each successive defined time interval.

9. A digital video recording system as recited in claim 1, wherein the content buffer is further configured to maintain the rendered video content received from one or more broadcast channels, and wherein the content buffer component is further configured to create a bookmark within the content buffer to identify a program change on a broadcast channel.

10. A digital video recording system as recited in claim 1, wherein the content buffer component is further configured to create a bookmark to indicate a broadcast channel change, and wherein the content buffer is further configured to maintain rendered video content corresponding to a first broadcast channel as the first content segment and rendered video content corresponding to at least a second broadcast channel as the second content segment.

11. A digital video recording system as recited in claim 1, wherein the content buffer component is further configured to create the first bookmark within the content buffer to indicate a broadcast channel change, and wherein the content buffer is further configured to maintain the first content segment of rendered video content corresponding to a first broadcast channel, rendered video content corresponding to at least a second broadcast channel as the second content segment, and the third content segment of rendered video content corresponding to the first broadcast channel.

12. A digital video recording system as recited in claim 1 further comprising a video recorder component configured to store the rendered video content, and wherein, based on the bookmarks, the content buffer component is further configured to communicate the rendered video content corresponding to a particular broadcast channel and maintained in the content buffer to the video recorder component as the single recording.

13. A digital video recording system as recited in claim 1 further comprising a video recorder component configured to store the rendered video content, and wherein, based on the bookmarks, the content buffer component is further configured to communicate the first content segment of rendered video content and the third content segment of rendered video content to the video recorder component, the first content segment and the third content segment corresponding to a particular broadcast channel and maintained in the content buffer.

14. A digital video recording system as recited in claim 13, wherein the content buffer component is further configured to identify the first content segment of rendered video content by an associated first channel change bookmark as the first bookmark within the content buffer, and identify the third content segment of rendered video content by an associated second channel change bookmark as the third bookmark within the content buffer.

15. A digital video recording system as recited in claim 13, wherein the content buffer component is further configured to delete the first content segment of rendered video content and the third content segment of video content from the content buffer.

16. A digital video recording system as recited in claim 1, wherein the content buffer component is further configured to create the one or more bookmarks within the content buffer as part of the rendered video content.

17. A digital video recording system as recited in claim 1, wherein the content buffer component is further configured to create the second bookmark within the content buffer to indicate a broadcast channel change to the second channel, the second bookmark created to include at least one of a first broadcast channel identifier for the first channel, a second broadcast channel identifier for the second channel, a program identifier to identify the program broadcast on the second broadcast channel, and a position identifier to identify a position of the second bookmark in the content buffer.

18. A digital video recording system as recited in claim 17, wherein the content buffer component is further configured to create the second bookmark as a data structure that identifies the second content segment of the rendered video content, the bookmark data structure maintained independent of the rendered video content.

19. A television-based entertainment system comprising the digital video recording system as recited in claim 1.

20. A computing device comprising the digital video recording system as recited in claim 1.

21. A data recording system, which facilities user management of one or more data streams, the data recording system comprising:

a receiver configured to receive the one or more data streams;

computer readable storage media;

a portion of the computer readable storage media configured as a content buffer configured to store segments of the one or more data streams; and a processor configured to implement a content buffer processing component (content buffer component) configured to identify the segments of the one or more data streams in the content buffer using identifiers, wherein the processor is configured to store a first portion of a first data stream as a first segment in the content buffer, wherein a first segment identifier indentifies the first segment, wherein, following receiving an instruction to switch from the first data stream to a second data stream, the processor is configured to store a portion of the second data stream in the content buffer as a second segment, wherein a second segment identifier identifies the second segment, wherein, following receiving a second instruction to switch back to the first data stream, the processor is configured to store a second portion of the first data stream in a third segment, wherein a third segment identifier identifies the third segment, wherein, following receiving an instruction to record, as recorded content, the first data stream being currently received, the processor is configured to add the first segment and the third segment to the recorded content to generate a single recording based on associations of the first segment identifier and the third segment identifier with the first data stream being currently received.

22. A data recording system as recited in claim 21, wherein the receiver receives video broadcast data streams.

23. A data recording system as recited in claim 21, wherein the receiver receives audio broadcast data streams.

24. A data recording system as recited in claim 21, wherein the receiver receives Internet broadcast data streams.

25. A data recording system as recited in claim 21, wherein the receiver receives video on-demand content data streams.

26. A data recording system as recited in claim 21, wherein the content buffer component is further configured to create a segment identifier data structure to identify one or more of the segments of the data streams in the content buffer.

27. A data recording system as recited in claim 21, wherein the content buffer component is further configured to create a segment identifier data structure to identify one or more of the segments of the data streams in the content buffer, and wherein the segment identifier indicates a video broadcast channel change.

28. A data recording system as recited in claim 21, wherein the content buffer component is further configured to create a segment identifier data structure to identify one or more of the segments of the data streams in the content buffer, and wherein the segment identifier indicates a program change on a video broadcast channel.

29. A data recording system as recited in claim 21, wherein the content buffer component is further configured to create a segment identifier data structure as part of one or more of the segments of the data streams to identify one or more of the segments of the data streams in the content buffer.

30. A data recording system as recited in claim 21, wherein the content buffer component is further configured to receive a viewer input to create a segment identifier data structure to identify one or more of the segments of the data streams in the content buffer.

31. A data recording system as recited in claim 21, further comprising a video recorder component configured to store the segments of the data streams stored in the content buffer.

32. A data recording system as recited in claim 21, further comprising a video recorder component configured to store the segments of the one or more data streams stored in the content buffer, and wherein the content buffer component is further configured to communicate the first and third segments of a the first data stream stored in the content buffer to the video recorder component.

33. A data recording system as recited in claim 21, further comprising a video recorder component configured to store the segments of the one or more data streams stored in the content buffer, and wherein the content buffer component is further configured to communicate the first segment of the first data stream and at least the third segment of the first data stream to the video recorder component.

34. A data recording system as recited in claim 33, wherein the content buffer component is further configured to identify the first segment of the particular data stream by the first segment identifier data structure, and identify the at least third segment of the first data stream by the third segment identifier, wherein the first segment identifier and the third segment identifier include identification of the first segment and third segment as corresponding to the first data stream.

35. A data recording system as recited in claim 33, wherein the content buffer component is further configured to delete the first segment of the first data stream and the at least third segment of the first data stream from the content buffer following adding of the first segment and third segment to the recorded content.

36. A data recording system as recited in claim 21, wherein the content buffer component is further configured to create a segment identifier to identify a segment of a broadcast channel data stream as one or more of the segments in the content buffer, the segment identifier created to include at least one of a first broadcast channel identifier, a second broadcast channel identifier, a program identifier to identify the program broadcast on the second broadcast channel, and a position identifier to identify a position of the segment identifier in the content buffer.

37. A data recording system as recited in claim 36, wherein the content buffer component is further configured to create the segment identifier as a data structure that identifies the segment of the broadcast channel data stream, the data structure maintained independent of the segment of the broadcast channel data stream.

38. A digital video recorder component comprising the data recording system as recited in claim 21.

39. A method which facilities viewer management of rendered video content, the method comprising:

receiving by a video receiver, video content from one or more broadcast channels;

storing the video content in a content buffer, wherein the content buffer is a single contiguous data stream stored upon a computer readable storage media; and creating one or more content identifying data structures (content identifiers) to identify segments of the video content stored in the content buffer, wherein at least one of the one or more content identifiers is created in response to input received from a viewer, and wherein the one or more content identifiers facilitate viewer management of the rendered video content;

storing video content received from a first channel as a first segment in the content buffer, wherein a first content identifier indentifies the first segment;

receiving a first channel change from the first channel to a second channel;

storing video content received from the second channel as a second segment in the content buffer, wherein a second content identifier identifies the second segment, receiving a second channel change to the first channel;

storing video content received from the first channel following the second channel change in a third segment, wherein a third content identifier identifies the third segment;

receiving an instruction to record, as recorded content, the video content being rendered from the first channel;

adding the first segment and the third segment to the recorded content to generate a single recording based on associations of the first content identifier and the third content identifier with the first channel being currently received.

40. A method as recited in claim 39, wherein a plurality of the one or more content identifiers are created in response to inputs received from the viewer.

41. A method as recited in claim 39, wherein creating includes creating a content identifier to indicate a broadcast channel change of the video content stored in the content buffer.

42. A method as recited in claim 39, wherein creating includes creating a channel change content identifier to identify each broadcast channel change, a channel change content identifier corresponding to a segment of the video content stored in the content buffer.

43. A method as recited in claim 39, wherein creating includes creating a content identifier to identify a segment of the video content corresponding to a defined time interval.

44. A method as recited in claim 39, wherein creating includes creating a content identifier to identify a program change on a broadcast channel.

45. A method as recited in claim 39, wherein storing includes storing the first segment of the video content as corresponding to a first broadcast channel and storing the second segment of the video content as corresponding to a second broadcast channel.

46. A method as recited in claim 45, wherein creating includes creating the first content identifier to identify the first segment of the video content and creating the second content identifier within the content buffer to identify the second segment of the video content.

47. A method as recited in claim 39, wherein creating includes creating the second content identifier to include at least one of a first broadcast channel identifier, a second broadcast channel identifier, a program identifier to identify the program broadcast on the second channel, and a position identifier to identify a position of the second content identifier in the content buffer.

48. A method as recited in claim 39, wherein creating the second content identifier includes creating a data structure to include at least one of a first broadcast channel identifier, a second broadcast channel identifier, a program identifier to identify the program broadcast on the second channel, and a position identifier to identify a position of the second content identifier in the content buffer.

49. A method as recited in claim 39, further comprising communicating the first and third segments of the video content corresponding to the first channel to be recorded as part of a single video recording corresponding to the single recording.

50. A method as recited in claim 39, further comprising recording the first and third segments of the video content corresponding to a the first channel with additional video content received from the first channel as a single recording in a separate location from the content buffer on a memory component.

51. A method as recited in claim 39, further comprising recording the first and third segments of the video content corresponding to the first channel as part of the single recording in a separate location from the content buffer on a memory component, and wherein the first segment of the video content is identified by an associated first channel change identifier and the first content identifier, and third segment of the video content is identified by an associated second channel change identifier as the third content identifier.

52. A method as recited in claim 39, further comprising deleting the first and third segments of the video content corresponding to the first channel from the content buffer following generating of the single recording.

53. A digital video recorder which facilities viewer management of broadcast channel data streams, comprising:

means for receiving one or more broadcast channel data streams;

means for storing segments of the one or more broadcast channel data streams in a content buffer;

means for bookmarking the segments of the one or more broadcast channel data streams stored in the content buffer;

wherein the means for storing stores a first portion of a first broadcast channel data stream as a first segment in the content buffer, wherein a first bookmark indentifies the first segment, wherein, following receiving an instruction to switch from the first broadcast channel data stream to a second broadcast channel data stream, the means for storing stores a portion of the second broadcast channel data stream in the content buffer as a second segment, wherein a second bookmark identifies the second segment, wherein, following receiving a second instruction to switch to the first broadcast channel data stream, the means for storing stores a second portion of the first broadcast channel data stream in a third segment, wherein a third bookmark identifies the third segment, means for recording, wherein, following receiving an instruction to record, as recorded content, the first broadcast channel data stream being currently received, the means for recording adds the first segment and the third segment to the recorded content to generate a single recording based on associations of the first bookmark and the third bookmark with the first broadcast channel data stream being currently received.

54. A digital video recorder as recited in claim 53, further comprising means for automatically bookmarking a broadcast channel change corresponding to one or more of the segments of the broadcast channel data streams stored in the content buffer.

55. A digital video recorder as recited in claim 53, further comprising means for receiving a plurality of viewer inputs to bookmark within the content buffer segments of the broadcast channel data streams stored in the content buffer.

56. A digital video recorder as recited in claim 53, wherein the means for recording the first and third segments corresponding to the first broadcast channel data stream records the first and third segments with the content currently being received from the first broadcast data stream in a separate location from the content buffer in a memory component.

57. Computer-readable storage media comprising computer-executable instructions that, when executed, direct a digital video recording system to perform a method, the method comprising:

receiving video content broadcast on a plurality of channels;

maintaining segments of the video content in a content buffer stored in computer readable storage media;

creating bookmark data structures (bookmarks) within the content buffer to identify the segments of the video content stored in the content buffer, storing video content received from a first channel as a first segment in the content buffer, wherein a first bookmark indentifies the first segment;

changing from the first channel to a second channel;

storing video content received from the second channel as a second segment in the content buffer, wherein a second bookmark identifies the second segment, changing to the first channel;

storing video content received from the first channel following changing to the first channel in a third segment, wherein a third bookmark identifies the third segment;

receiving an instruction to record, as recorded content, the video content being received from the first channel;

adding the first segment and the third segment to the recorded content to generate a single recording based on associations of the first bookmark and the third bookmark with the first channel being currently received.

58. Computer-readable storage media as recited in claim 57, further comprising computer executable instructions that, when executed, direct the digital video recording system to create a-channel change bookmarks as the bookmarks to identify the segments of the video content corresponding to a particular channel.

59. Computer-readable storage media as recited in claim 57, further comprising computer executable instructions that, when executed, direct the digital video recording system to receive a plurality of viewer inputs to create one or more bookmarks within the content buffer to identify the segments of the video content.

60. Computer-readable storage media as recited in claim 57, further comprising computer executable instructions that, when executed, direct the digital video recording system to create a bookmark within the content buffer to identify a segment of the video content corresponding to a defined time interval.

61. Computer-readable storage media as recited in claim 57, further comprising computer executable instructions that, when executed, direct the digital video recording system to create a bookmark within the content buffer to identify a segment of the video content corresponding to a program change on a channel.

62. Computer-readable storage media as recited in claim 57, further comprising computer executable instructions that, when executed, direct the digital video recording system to record the first and third segments of the video content maintained in the content buffer that correspond to the first channel as part of the single recording in a separate location from the content buffer on a memory component.

63. Computer-readable storage media as recited in claim 57, further comprising computer executable instructions that, when executed, direct the digital video recording system to create the second bookmark within the content buffer to include at least one of a first channel identifier, a second channel identifier, a program identifier to identify the program broadcast on the second channel, and a position identifier to identify a position of the second bookmark in the content buffer.

* * * * *

UNITED STATES PATENT AND TRADEMARK OFFICE

CERTIFICATE OF CORRECTION

PATENT NO. : 7,725,919 B1
APPLICATION NO. : 10/154762
DATED : May 25, 2010
INVENTOR(S) : Balaji Thiagarajan et al.

It is certified that error appears in the above-identified patent and that said Letters Patent is hereby corrected as shown below:

In column 13, line 55, in Claim 32, delete “a the” and insert -- the --, therefor.

In column 15, line 47, in Claim 50, delete “a the” and insert -- the --, therefor.

In column 17, line 10, in Claim 58, delete “a-channel” and insert -- channel --, therefor.

Signed and Sealed this
Twenty-fifth Day of January, 2011

David J. Kappos
*Director of the United States Patent and Trademark Office*